June 30, 1942.  H. W. MUNRO  2,288,296
DOLL
Filed Nov. 19, 1940  2 Sheets-Sheet 1

INVENTOR.
Harold W. Munro
BY Barlow & Barlow
ATTORNEYS.

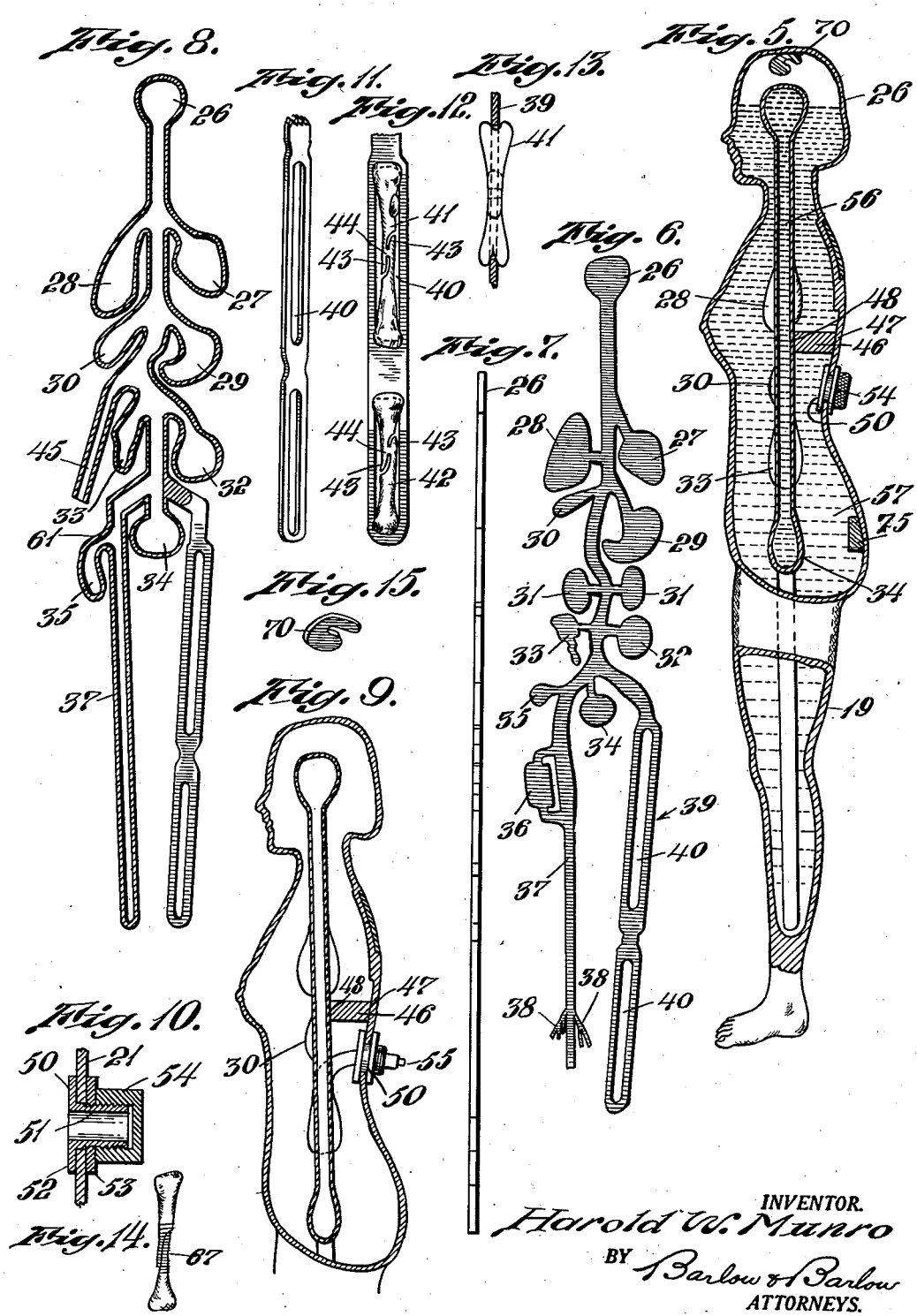

Patented June 30, 1942

2,288,296

UNITED STATES PATENT OFFICE 2,288,296

DOLL

Harold W. Munro, Providence, R. I.

Application November 19, 1940, Serial No. 366,249

9 Claims. (Cl. 35—17)

This invention relates to a doll and has for one of its objects making a structure which may have performed upon it operations comparable to surgical operations performed upon the human body.

Another object of the invention is to provide a structure which may enclose a variety of hidden parts simulating internal organs, growths, bones, etc., the known presence of which would prove mysterious and interesting to children even if the parts were not, as in this case, specially designed to arouse curiosity and urge those who like to do things with their hands to look in among said hidden parts and perform various original and mapped-out operations upon them.

A further object of the invention is to provide a pastime absorbing the operator for periods of considerable extent, calling for real dexterity in the use of the hands and plainly showing by the resulting work how, with practice, this dexterity may develop into actual and gratifying skill.

Another object of the invention is the education of the operator both from the standpoint of the particular subject involved and more generally to promote in the operator ability to interpret and follow instructions as well as training in technique in the use of instruments and the turning out of neat work.

Another object of the invention is to provide a structure permitting sufficiently numerous, varied and complex operations to allow the operating to be properly classed as a game or pastime of skill and admirably suitable for competitions.

A more specific object of the invention is to increase any interest shown by young people in learning about the parts of the body and surgical operations which may be necessary or helpful to the preservation or betterment of the body or health.

With these and other objects in view, the invention consists of certain novel features of construction, as will be more fully described, and particularly pointed out in the appended claims.

In the accompanying drawings:

Fig. 5 is a view similar to Fig. 3 illustrating a liquid in the hollow body cavity and showing the leg also in section;

Fig. 6 is an elevation of the internal parts of the doll shown in solid formation;

Fig. 7 is a side elevation of Fig. 6;

Fig. 8 is a view similar to Fig. 6 but modified in that some of the internal parts are formed hollow by a suitable change in the structure thereof;

Fig. 9 is a sectional view of the doll showing the inner portions of Fig. 8 arranged for filling;

Fig. 10 is a sectional view of the closure unit;

Fig. 11 is a perspective view of a sling portion for containing the bone;

Fig. 12 is an elevation showing imitation bones in the sling;

Fig. 13 is a section illustrating a bone as mounted in the sling;

Fig. 14 is an elevation of a bone shown broken and mounted; and

Fig. 15 is an individual growth located separately in the body;

Figure 1:
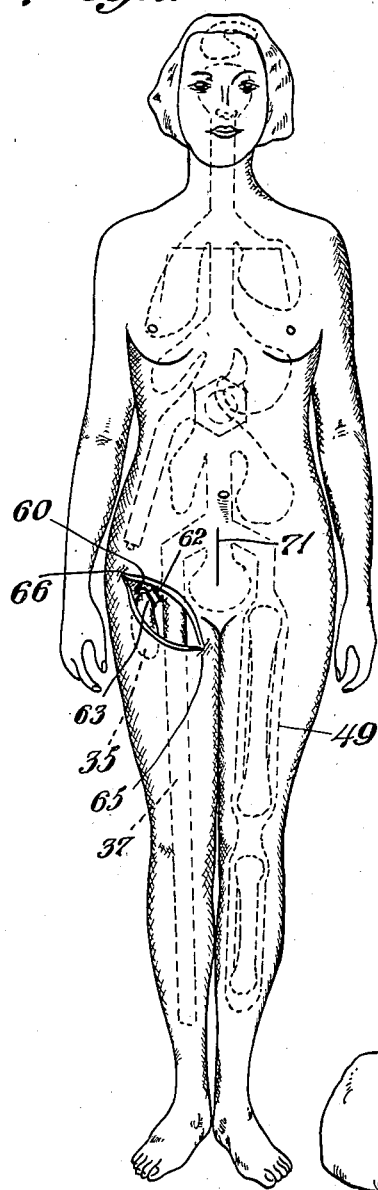
Fig. 1 is an elevation of a doll showing an incision made therein.
Figure 2:
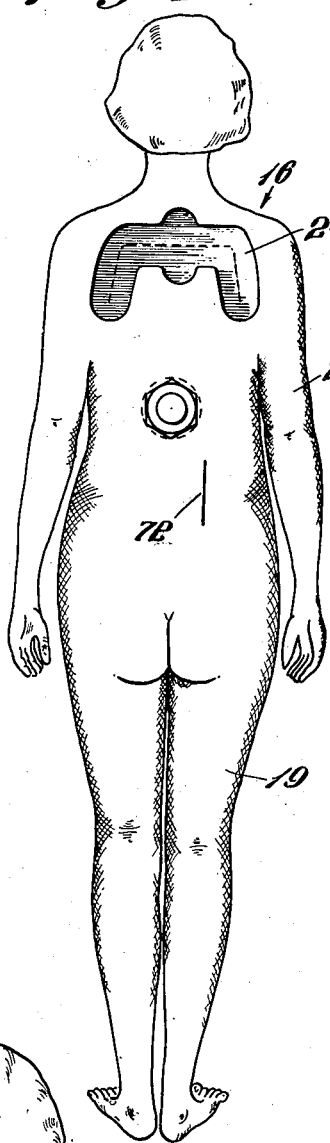
Fig. 2 is a rear elevation.

With reference to the drawings, 16 designates generally the body portion of the doll made in the likeness of the human figure which consists more specifically of the torso 17, head 18, legs 19 and arms 20. Each of these parts of the body 16 is hollow and is preferably formed of molded rubber or some resilient material formed from sheets and eventually inflated in the mold into finished form with the halves vulcanized together whereby the walls 21 of each of these parts are relatively thin and capable of being easily cut by instruments such as scissors or a knife. After molding this structure, I provide an opening 22 in a recess in the back of the torso with a flap 23 for closing this opening, while an additional piece of material 24 will be cemented or vulcanized in position over the joint formed by the closure 23 in the recess surrounding the opening and provided therefor. This opening 22 is for the purpose of receiving within the cavity 25, the body, head and legs the various structures simulating parts hidden from view in the human body such as internal organs, growths, bones or the like.

These internal parts are formed either separately as the growth 70 attached to some part of the cavity as in the head 18, or as a chain of units and may take the form shown in Fig. 6 where I have illustrated a chain of parts in a solid formation such as might be cut from sheet stock or molded in the form which is shown. These parts are for representing the brain at 26, heart 27, lung 28, stomach 29, gall bladder 30, kidneys 31, tumor 32, appendix 33, bladder 34, abscess 35, and bone growth 36 on the portion 37 extending into the leg which has additionaly varicose veins at 38. The other extension into the leg is in the form of a sling 39 having openings 40 for the reception of stiffer formations representing bones 41 and 42. Each of these bones is pre-formed with a recess 43 interrupted as by web 44 so as to define a break line therein.

These internal parts may be formed in a modified manner such as shown in Fig. 8 in which the chain of parts except for the extension into one leg is hollow. I have given the same numbers to the corresponding parts as represented in Fig. 8 as heretofore described in connection with Fig. 6. There is, however, in this arrangement a filling tube 45 which may be withdrawn from the body for filling purposes. The internal parts of the body may be separately formed and inserted through the opening 22 after the body has been completed and vulcanized; or, in some cases, the internal parts may be fixed in place such as by a connecting member 46 attached to the body wall as at 47 and to the internal parts as at 48 by vulcanizing as when the halves of the body are vulcanized and thus support the internal parts in desired position. These internal parts may also be supported at other points, or each may be separate, as is part 70, representing a brain tumor, and placed in the cavity and attached by itself either before or after vulcanization. The location of the internal parts may be designated in some fashion, such for instance, as by the dotted line 49 on the surface of the body so that the location and character of the parts may be readily observed. Also, a line 71 to represent the location for an incision may be placed on the surface of the body.

When the hollow internal parts such as shown in Fig. 8 are utilized, the tube 45 will be drawn out through filling unit 50 consisting of a metal, externally-threaded sleeve 51 with flanges 52 and 53 securing it on the wall 21 and provided with a cap 54 such as shown in Fig. 10. After filling with a liquid 56 for filling the hollow structure of Fig. 8 through the filling opening 50, a plug 55 will be placed in the tube end 45 and then the tube will be again inserted in the cavity 25 of the body. A different liquid 57 may be utilized for the body cavity 25 such as by filling through the filling unit 50. In many cases, however, it may be desirable to omit part or all of this second filling liquid 57, making a somewhat simpler structure and one which will be less liable to spill when being used.

In use, if it is desired that the abscess 35 be removed, an incision 60 will be made by some suitable supplied tool, as indicated in Fig. 1, adjacent the juncture of this abscess with the portion 37, and, if the type of internal parts illustrated in Fig. 8 is used, the junction 61 of this abscess with the part 37 will be bound off by two separate flexible members such as string 62 and 63 and then when these are tied off snugly, a cut will be made between the two ties to successfully remove the abscess without spilling any of the liquid which may be contained within the chain of units such as shown in Fig. 8 and which contains a liquid 56. Similarly, other parts of the internal organs may be removed by slitting along lines 71 or 72 as described, or by making other incisions.

In order to prevent the slit from running beyond the amount required, it is desirable that the ends of the slit be sewed across as at 65 and 66 and after the operation is complete, the incision will be sewed together again and cemented together with a transparent rubber patch such as indicated at 24, or the patch 24 may not be transparent.

If a bone is broken, which may be done by reason of the flexibility of the leg 19, the break will occur at the point 44 as indicated in Fig. 12, and an incision will be made adjacent the broken bone, the bone removed from the sling, and joined together as indicated by the winding 67 in Fig. 14, then the bone replaced again in the slot 40 of the sling which is of a length to require some stretching in order to bind the bone in place, and the incision will be again sewed together as heretofore indicated.

If the liquid 57 is present in the cavity at the time the operation is made, greater care will be necessary in order that this liquid will not escape.

It will thus be apparent that by planting internal parts within the body cavity, making the adjacent body wall thin so that it may be easily cut and stretched, I may provide internal parts which may be accessible through the medium of an operation simulating surgery and by utilizing the hollow liquid-filled internal parts make the operation sufficiently complicated so that enough skill will be required to make the device interesting to those who like to use the hands and thus promote the dexterity and coordination physically required for performing the operation.

Figure 3:
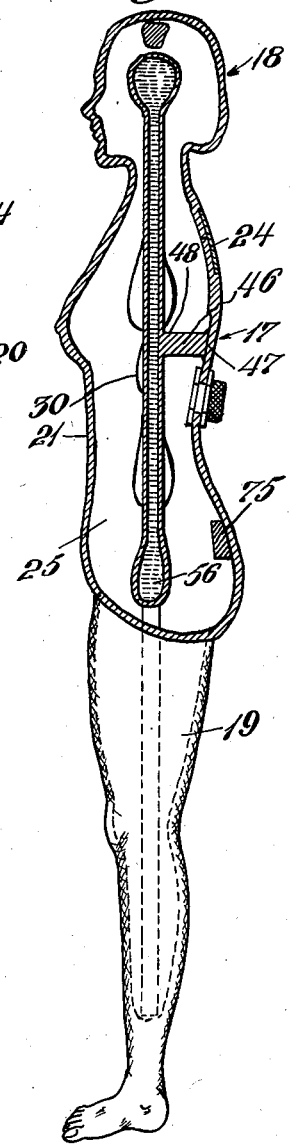
Fig. 3 is a central sectional view.
Figure 4:
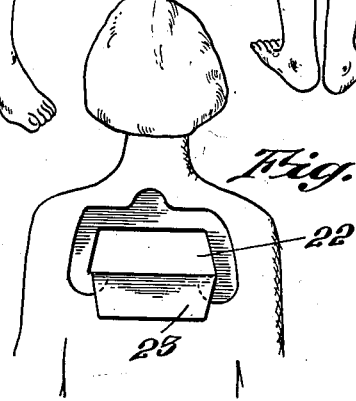
Fig. 4 is a view similar to Fig. 2 of a fragmental portion and showing a portion of the back forming an entrance.

In some cases, it may be desirable to provide a self-closing block of soft rubber or like material 75 as seen in Fig. 3 and Fig. 5 which is of such a nature that a needle may be passed through the body wall and through this block into the hollow cavity the material being such that when the needle is withdrawn, the opening will be closed by the resilient block closing the opening made by the needle and by this means I may use a needle to inject or withdraw liquid from the body cavity.

In some cases the body cavity may contain a chemical or a part susceptible to some other chemical, either of which may set up a reaction with another chemical to be injected by a needle or otherwise introduced into the body cavity and pressure created to expand the body or otherwise affect its contents including the susceptible part until relief is afforded by an operation.

I claim:

1. The method of operating on a doll having a hollow rubber-like body and internal parts within, which consists in slitting the rubber-like body, binding the ends of the slit against tearing, and spreading the slit for access to the interior.

2. The method of operating on a doll having a hollow rubber-like body and internal parts within, which consists in slitting the rubber-like body, sewing across the slit at the ends of the slit to prevent tearing of the slit, spreading the slit for access to the interior, and then closing said slit.

3. The method of operating on a doll having a hollow rubber-like body and internal parts within, which consists in slitting the rubber-like body, sewing across the slit at the ends of the slit to prevent tearing of the slit, spreading the slit for access to the interior, then closing said slit by sewing the slit together, and sealing a patch over the closed slit.

4. A toy doll shaped in the form of a mammal organism comprising an outer body wall having a hollow cavity with an inner member in the cavity of some readily severable material simulating an internal organism and of a size to occupy substantially less space than said cavity, said body wall being of an elastic homogeneous material sufficiently stiff and self-supporting to hold its shape at a location adjacent said internal member and at such location being capable of being cut through and spread apart at the cut, said body wall being entirely closed against access to said internal member except by cutting through the body wall.

5. A toy doll shaped in the form of a mammal organism comprising an outer body wall having a hollow cavity with an inner member in the cavity of some readily severable material simulating an internal organism in the form of a hollow sack capable of containing liquid therein and of a size to occupy substantially less space than said cavity, said body wall being of an elastic homogeneous material sufficiently stiff and self-supporting to hold its shape at a location adjacent said internal member and at such location being capable of being cut through and spread apart at the cut, said body wall being entirely closed against access to said internal member except by cutting through the body wall.

6. A toy doll shaped in the form of a mammal organism comprising an outer body wall having a hollow cavity with an inner member in the cavity in the form of a flexible sling with a slot therein, and a stiffer material simulating a bone in said slot and removable therefrom, said body wall at a location adjacent said internal member being capable of being cut through and spread apart at the cut.

7. A toy doll shaped in the form of a mammal organism comprising an outer body wall having a hollow cavity with an inner member in the cavity in the form of a flexible sling with a slot therein, and a stiffer material simulating a bone in said slot and removable therefrom, said material being weakened to facilitate breaking along a predetermined line.

8. A toy doll shaped in the form of a mammal organism comprising an outer body wall having a hollow cavity with an inner member in the cavity in the form of an elastic sling with a slot therein, and a stiffer material simulating a bone in said slot and removable therefrom, said material being weakened along a line in a diagonal direction to facilitate breaking along a predetermined line and provide an overlapping joint.

9. A toy doll shaped in the form of a mammal organism comprising an outer body wall having a hollow cavity with an inner member in the cavity, at least a part of said member being chemically pretreated to react with a predetermined treatment from the outside, said body wall at a location adjacent said internal member being capable of being cut through and spread apart at the cut.

HAROLD W. MUNRO.